US010987613B2

(12) United States Patent
Ammersdoerfer

(10) Patent No.: US 10,987,613 B2
(45) Date of Patent: Apr. 27, 2021

(54) FILTER SYSTEM WITH CENTRAL ELEMENT AND STRAINER FILTER

(71) Applicant: MANN+HUMMEL GmbH, Ludwigsburg (DE)

(72) Inventor: Micha Ammersdoerfer, Stuttgart (DE)

(73) Assignee: Mann+Hummel GmbH, Ludwigsburg (DE)

( * ) Notice: Subject to any disclaimer, the term of this patent is extended or adjusted under 35 U.S.C. 154(b) by 60 days.

(21) Appl. No.: 15/983,409

(22) Filed: May 18, 2018

(65) Prior Publication Data
US 2018/0333662 A1 Nov. 22, 2018

(30) Foreign Application Priority Data
May 19, 2017 (DE) ...................... 10 2017 004 813.4

(51) Int. Cl.
| *B01D 29/21* | (2006.01) |
| *B01D 35/30* | (2006.01) |
| *B01D 36/00* | (2006.01) |
| *B01D 17/04* | (2006.01) |
| *B01D 35/18* | (2006.01) |

(Continued)

(52) U.S. Cl.
CPC ........... *B01D 29/21* (2013.01); *B01D 17/045* (2013.01); *B01D 29/58* (2013.01); *B01D 35/18* (2013.01); *B01D 35/306* (2013.01); *B01D 36/003* (2013.01); *B01D 36/005* (2013.01); *B01D 2201/295* (2013.01); *B01D 2201/305* (2013.01); *B01D 2201/347* (2013.01); *B01D 2201/4084* (2013.01)

(58) Field of Classification Search
CPC .... B01D 29/21; B01D 36/003; B01D 35/306; B01D 17/045; B01D 29/58; B01D 36/005; B01D 35/18; B01D 2201/295; B01D 2201/4084; B01D 2201/305; B01D 2201/347; B01D 35/30; B01D 29/11
See application file for complete search history.

(56) References Cited

U.S. PATENT DOCUMENTS

| 2014/0284268 A1* | 9/2014 | Volkmer | .............. | B01D 36/003 |
| | | | | 210/493.2 |
| 2014/0353236 A1 | 12/2014 | Klein | | |

(Continued)

FOREIGN PATENT DOCUMENTS

| WO | WO-2010049208 A1 * | 5/2010 | ............. B01D 35/18 |
| WO | WO-2015018785 A1 * | 2/2015 | |

*Primary Examiner* — Waqaas Ali
(74) *Attorney, Agent, or Firm* — James Hasselbeck

(57) ABSTRACT

A filter system for filtering a fluid is provided with a filter housing that has a housing top part and a housing bottom part arranged along a housing axis of the filter housing. An inlet socket is arranged at the housing top part for supplying a fluid to be filtered. An outlet socket is arranged at the housing top part for discharging the fluid. A filter element is provided with a filter bellows arranged about a longitudinal axis of the filter element. The filter element, installed inside the filter housing, fluidically separates a raw fluid side from a clean fluid side. A central element is attached to the filter housing and extends along the housing axis. The central element is separate from the filter element and projects into an interior of the filter element. A strainer filter is arranged at the central element.

8 Claims, 3 Drawing Sheets

(51) Int. Cl.
*B01D 29/58* (2006.01)
*B01D 29/11* (2006.01)

(56) References Cited

U.S. PATENT DOCUMENTS

2016/0151727 A1* 6/2016 Moreno Linares .. B01D 36/003
  210/497.01
2017/0087486 A1 3/2017 Opletal et al.

* cited by examiner

FILTER SYSTEM WITH CENTRAL ELEMENT AND STRAINER FILTER

TECHNICAL FIELD

The invention concerns a filter system, with a central element and a strainer filter, for filtering a fluid, in particular for a fuel filter of an internal combustion engine, as well as a filter housing and a filter element for such a filter system.

BACKGROUND OF THE INVENTION

DE 10 2013 009 198 A1 discloses a fuel filter with a filter housing and with an element-associated electrical connecting element and with a housing-associated electrical connecting element, in which the element-associated connecting element and the housing-associated connecting element are electrically connected to each other when the filter element is installed in the filter housing. In the filter housing, a guiding ramp with a ramp surface is arranged. Upon insertion of the filter element into the filter housing in axial direction relative to the filter axis with the connecting end face leading, the element-associated connecting element and another section of the connecting end face hit the ramp surface. Upon rotation of the filter element in the filter housing about the filter axis in a rotational direction which corresponds to the screw-like course of the ramp surface and upon simultaneous movement of the filter element in axial direction toward the connecting end face of the filter housing, the filter element is guided along the ramp surface. The housing-associated electrical connecting element is arranged at the end of the ramp surface. The element-associated connecting element connects then electrically with the housing-associated connecting element. In this way, the filter element is positioned in the correct installation position in the filter housing. Closing of the electrical connection is realized by the rotation/insertion movement of the filter element.

DE 10 2015 012 473 A1 discloses a filter element that comprises a hollow cylindrically shaped filter medium body having a central element with strainer filter fastened in its interior. The central element may comprise in particular a water level sensor which comprises a water detection pin at a first end and comprises contacts for connection to a measuring circuit at its second end. The central element with strainer filter is configured to be rotatable relative to the filter medium body and, at the end with the contacts, catching elements are provided that enable a contacting action with a cover-associated counter contact when screwing shut a filter housing. A disadvantage is herein that the central element and the strainer filter, which constitute from experience a major portion of the costs of such a filter element, must be replaced with every filter element change.

SUMMARY OF THE INVENTION

Based on this, it is the object of the invention to provide a filter system with a strainer filter which can be easily mounted and is inexpensive.

Further objects of the invention reside in providing a filter housing and an exchangeable filter element for use in a filter system which can be easily mounted and is inexpensive.

The aforementioned objects are solved according to an aspect of the invention by a filter system comprising a filter housing with a housing axis, a housing top part and a housing bottom part arranged along the housing axis, as well as a filter element that fluid-tightly separates a raw fluid side from a clean fluid side, wherein the filter element comprises a filter bellows which is arranged about a longitudinal axis of the filter element, wherein a housing-associated central element with a strainer filter, which is projecting into an interior of the filter element, is fastened to the filter housing along the housing axis.

Beneficial embodiments and advantages of the invention result from the additional claims, the description, and the drawing.

A filter system for filtering a fluid is proposed, comprising a filter housing with a housing axis, a housing top part and a housing bottom part arranged along the housing axis, an inlet socket arranged at the housing top part for supplying a fluid to be filtered, an outlet socket arranged at the housing top part for discharging the filtered fluid, as well as a filter element that fluid-tightly separates a raw fluid side from a clean fluid side, wherein the filter element comprises a filter bellows which is arranged about a longitudinal axis of the filter element. A housing-associated central element with a strainer filter, which is projecting into an interior of the filter element, is fastened to the filter housing along the housing axis.

A fuel filter system with a multi-stage, for example, three-stage, water separation comprises as a final separator a fine-mesh strainer filter as a hydrophobic blocking device so that water coalesced in the filter bellows and in a coalescing stage cannot pass to the clean fluid side of the filter system but is separated at the strainer filter and is discharged from the filter housing. According to the invention, this strainer filter is arranged at a central element which is fastened to the filter housing; this is in contrast to the prior art in which the strainer filter is arranged in the interior of the filter element and is fixedly connected thereto.

According to the invention, the strainer filter arranged at the central element is however connected to the filter housing and in particular configured to be detachable from the filter element. In this context, the central element can be arranged fixedly at the filter housing, for example, can be glued, fused or in a similar way fixedly connected to the filter housing. Alternatively, it is however also possible that the central element is detachably connected to the filter housing, for example, can be pulled off. In this way, it is possible to exchange also the central element with strainer filter, as needed.

The central element is provided for receiving the filter element in that, for example, the filter element is pushed onto the central element. In this way, the filter element can be connected detachably with the central element.

The advantage of a separate arrangement of the central element with strainer filter at the filter housing instead of at the filter element resides in that the filter element, for example, when laden with dirt, can be exchanged without the strainer filter; the strainer filter remains in the housing and can be reused. Since the strainer filter due to the screen material constitutes a comparatively expensive component in comparison to the filter element, costs can be saved in this way in operation of a filter system with a exchangeable filter element.

Moreover, the fixedly installed central element with strainer filter can protect the clean fluid side of the filter system from contamination when exchanging the filter element because the clean fluid side is sealed by the strainer filter relative to the raw fluid side and the strainer filter can keep larger dirt particles away from the clean fluid side in this way.

A further advantage of the fixedly installed central element with strainer filter resides in that a water level sensor, for example, a so-called water-in-fuel (WIF) sensor, can be arranged in integrated fashion in the central element. In this context, a failure-prone contact location between a conduit in the central element and the sensor can be avoided because this central element must not be exchanged when exchanging the filter element.

According to an advantageous embodiment, the filter housing can comprise an inwardly positioned receptacle which is provided for sealing between the raw fluid side and the clean fluid side and/or for provided radial centering of the filter element in the filter housing upon proper interaction with a centering element of the filter element. The receptacle serves in this context for centering the filter element in the filter housing so that the filter element can be arranged along the housing axis. Also, the receptacle can comprise sealing surfaces, which are contacted by seals of the filter system, for sealing between raw fluid side and clean fluid side of the filter system. In this way, an effective sealing action can be ensured.

According to an advantageous embodiment, the central element can be connected by means of the receptacle to the filter housing. By means of the receptacle, the central element can be aligned along the housing axis and fastened to the filter housing. In this context, the central element can be fixedly connected with the filter housing, for example, glued or fused thereto. Alternatively, it is however also possible that the central element is detachably connected to the filter housing, for example, by means of locking devices or similar fastening elements so that the central element with strainer filter can also be possibly exchanged.

According to an advantageous embodiment, the receptacle can be arranged at the housing top part. In this way, it is possible, when removing the housing top part from the housing bottom part, to remove the filter element arranged at the receptacle together with the housing top part from the filter housing in order to then remove it from the receptacle and from the central element and to exchange it.

According to an advantageous embodiment, the strainer filter can be arranged radially outwardly about the central element. The central element serves as a support for the mechanically less stable strainer filter which in this way can be fastened by means of the central element in the filter housing. In this way, the separated water can drain between central element and strainer filter by the force of gravity in downward direction and can be discharged from the filter housing.

According to an advantageous embodiment, the central element can comprise at least one conductor which is provided for electrical contacting of a sensor that is arranged at the central element or is connected to the central element, in particular a water level sensor. At the lower end of the central element, for example, a so-called water-in-fuel (WIF) sensor can be arranged which can determine the water level of the separated water and can control in this way drain functions of the filter system. Contacting of such a sensor is possible by means of a conductor arranged in the central element in an advantageous way.

According to an advantageous embodiment, the at least one conductor can be connected by means of at least one central element-associated electrical connecting element with at least one housing-associated electrical connecting element. In case of a detachable arrangement of the central element in the filter housing, a reliable contacting of the conductor and thus of a sensor arranged in the central element can be realized in this way.

According to an advantageous embodiment, the sensor and/or a heater can be provided in an integrated fashion in the central element. The integration of sensors and/or heaters in the central element saves additional contacting locations between conductor in the central element and sensor and/or heater so that possible error sources can be avoided. Also, due to the integrated arrangement, sensors and/or heaters are protected from damage by means of the central element.

According to a further aspect, the invention concerns a filter housing for a filter system, comprising a housing top part and a housing bottom part with a housing axis, an inlet socket arranged at the housing top part for supplying a fluid to be filtered, an outlet socket arranged at the housing top part for discharging the filtered fluid. At the filter housing, a housing-associated central element with a strainer filter is arranged along the housing axis wherein the central element is provided for detachably receiving a filter element.

According to the invention, the strainer filter which is arranged at the central element is connected with the filter housing. In this context, the central element can be fixedly arranged at the filter housing, for example, can be glued, fused or in a similar way fixedly connected to the filter housing. Alternatively, it is however also possible that the central element is detachably connected to the filter housing, for example, can be pulled off. In this way, it is possible to exchange the central element with strainer filter, if need be. In this context, filter element and central element with strainer filter can be separately exchanged.

The central element is provided for receiving the filter element in that, for example, the filter element is pushed onto the central element. In this way, the filter element can be detachably connected to the central element.

According to a further aspect, the invention concerns a filter element for filtering a fluid. The filter element, provided with a longitudinal axis, comprises a filter bellows arranged about the longitudinal axis and comprises a first end disk at a first end face and a second end disk at a second end face, wherein the filter element is provided for receiving a central element with a strainer filter in an interior of the filter bellows upon proper installation in a filter housing of a filter system.

The central element is provided for receiving the filter element in that, for example, the filter element is pushed onto the central element. In this way, the filter element can be connected detachably to the central element. Upon flow of fuel through the filter element from a radial exterior side into the interior of the filter bellows, the water dissolved in the fuel is coalesced in the filter bellows and in a downstream coalescing stage so that the water can then be separated at the strainer filter which is arranged in the interior of the filter bellows. In this way, an effective water separation in the filter system is possible.

According to an advantageous embodiment, the filter element can be configured to be pushed onto the central element. In this way, a simple installation of the filter element in the filter housing and thus in the filter system is possible. The filter element can thus be detachably connected to the filter housing so that an exchange can be performed in a simple way.

According to an advantageous embodiment, a central tube for receiving the central element can be provided in the interior of the filter bellows. The central tube serves for reinforcing the filter element in that it stabilizes the filter bellows against fluid pressure of the fuel flowing from the exterior to the interior. Moreover, the central tube can serve as a support for a coalescing medium for coalescing smaller water droplets to larger water droplets.

According to an advantageous embodiment, the filter element can be configured to lock with the filter housing by means of locking elements. By means of locking elements, the filter element can be reliably fixed to the filter housing. At the same time, by means of the locking device a detachable connection can be provided so that the filter element can also be exchanged, as needed.

According to an advantageous embodiment, the second end disk can comprise locking elements for installation in a filter housing of a filter system. By arrangement of the locking elements at the second end disk, the filter element can be locked, for example, with the receptacle in the housing top part of the filter housing in a simple way and can thus be reliably connected to the filter housing.

According to an advantageous embodiment, radially inside the filter bellows a coalescing medium can be provided that is arranged about the longitudinal axis. The coalescing medium can thus coalesce in an effective way water dissolved in the fuel to larger drops so that the water drops can be separated at the strainer filter provided as a final separator.

According to an advantageous embodiment, a seal provided radially outwardly at the first end disk and a seal provided radially inwardly at the second end disk can be provided for sealing between a raw fluid side and a clean fluid side upon proper use in a filter housing of a filter system. Upon insertion of the filter element into the filter housing and closing of the filter housing, these seals can seal the raw fluid side relative to the clean fluid side in interaction with a sealing surface at the inner side of the housing bottom part, on the one hand, and with a sealing surface at the exterior side of the receptacle of the housing top part, on the other hand.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will also consider the features expediently individually and combine them to meaningful further combinations. The Figures show an embodiment in an exemplary fashion.

DESCRIPTION OF PREFERRED EMBODIMENTS

Figure 1:
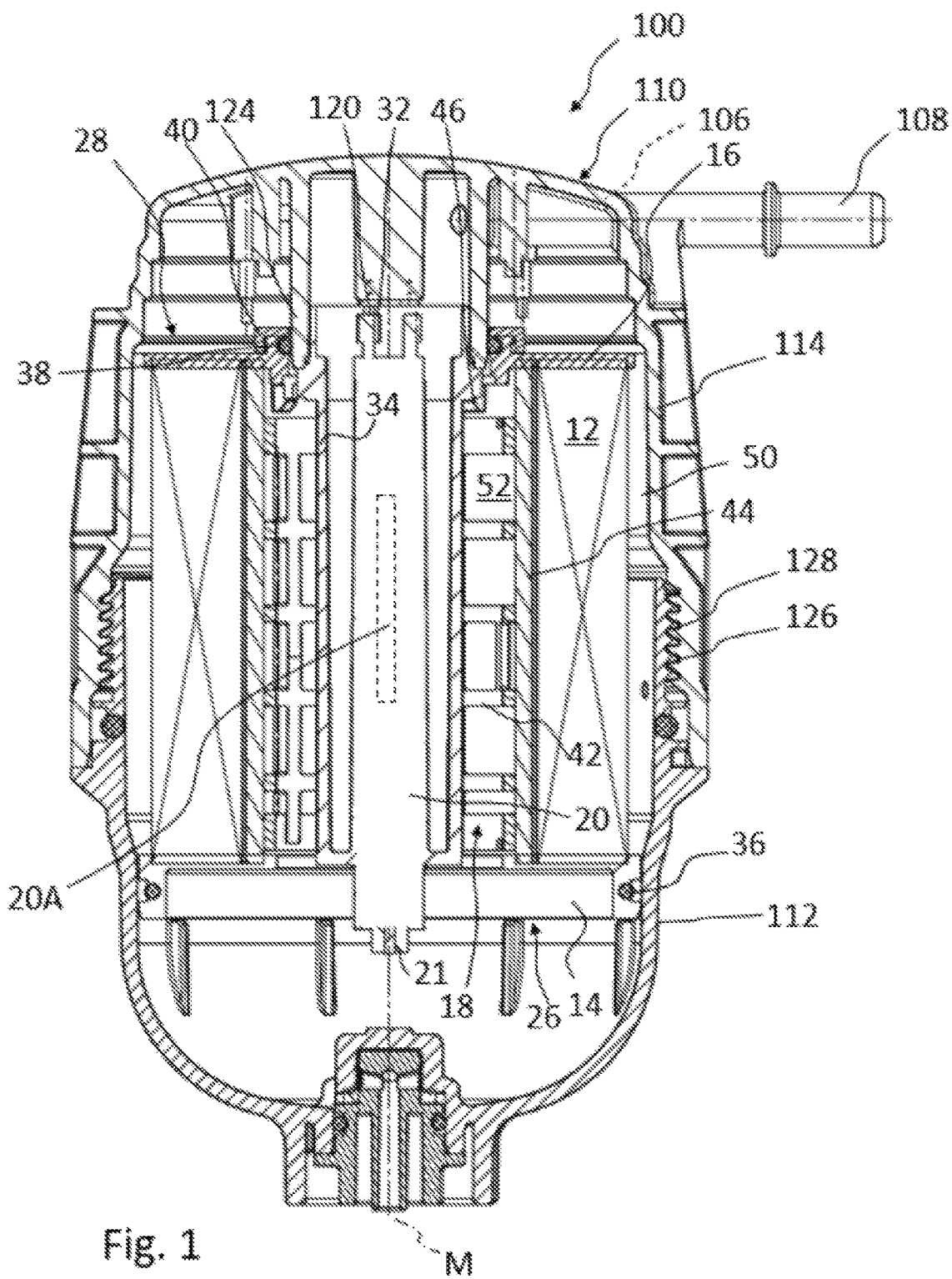
FIG. 1 is a longitudinal section of the filter system according to an embodiment of the invention with a filter housing at which a central element with a strainer filter is fastened.

In the Figures, same or same type components are identified with same reference characters. The Figures show only examples and are not to be understood as limiting.

FIG. 1 shows a longitudinal section of a filter system 100 for filtering a fluid according to an embodiment of the invention with a filter housing 110 to which a central element 20 with a strainer filter 34 is fastened. The filter system 100 comprises a filter housing 110 with a housing axis M, a housing top part 114 and a housing bottom part 112 disposed along the housing axis M, an inlet socket 106 arranged at the housing top part 114 for supplying a fluid to be filtered, and an outlet socket 108 arranged at the housing top part 114 for discharging the filtered fluid. The inlet socket 106 cannot be seen in section view; it guides, at the marked location (106), the fluid to the raw fluid side 50 of the housing top part 114. Moreover, the filter system 100 comprises a filter element 10 that fluid-tightly separates the raw fluid side 50 from the clean fluid side 52, wherein the filter element 10 comprises a filter bellows 12 arranged about the longitudinal axis L of the filter element 10. At the filter housing 110, along the housing axis M a housing-associated central element 20 with a strainer filter 34 is fastened which is projecting into an interior 18 of the filter element 10. The strainer filter 34 is arranged radially outwardly about the central element 20.

Housing top part 114 and housing bottom part 112 are fluid-tightly connected to each other by screw threads 126, 128.

The filter element 10 with a longitudinal axis L comprises a filter bellows 12 which is arranged about the longitudinal axis L, with a first end disk 14 at a first end face 26 and a second end disk 16 at a second end face 28. The filter element 10 is configured to receive the central element 20 with the strainer filter 34 in the interior 18 of the filter bellows 12.

The filter element 10 comprises in its interior 18 within the filter bellows 12 a central tube 42 which serves for reinforcing the filter bellows 12 relative to the fluid pressure of the filtered fluid. A coalescing medium 44 is arranged between filter bellows 12 and central tube 42. The filter element 10 is pushed with the central tube 42 onto the elongated central member (34+20) having the central element 20 and fixedly connected strainer filter 34 so that the strainer filter 34 is arranged radially inside of the coalescing medium 44 and can serve effectively for final separation of the coalesced water.

Figure 2:
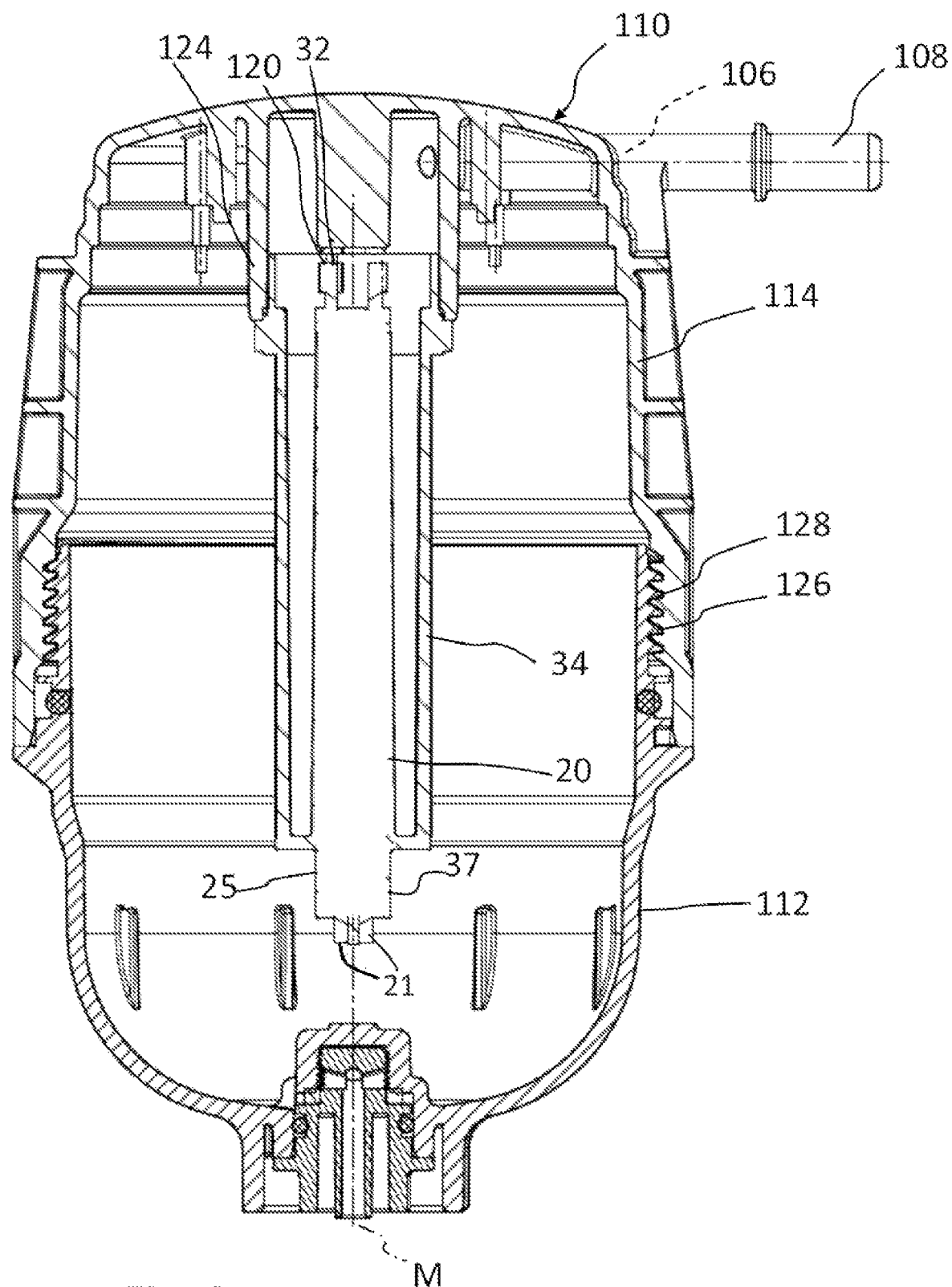
FIG. 2 is a longitudinal section of the filter housing with central element and strainer filter of the filter system of FIG. 1.

The filter housing 110 comprises an inwardly positioned annular receptacle 124 which is arranged at the housing top part 114 and which is provided for sealing between the raw fluid side 50 and the clean fluid side 52 and for radially centering the filter element 10 in the filter housing 110 upon proper interaction with a centering element 40 of the filter element 10. The central element 20 is fastened to the receptacle 124, for example, glued or fused, and is thus connected to the filter housing 110. As can be seen in FIGS. 2 and 1, an outlet socket 108 is arranged on the housing top part 114 and fluidically connected to an interior of the annular receptacle 124 through the top housing part 114, the outlet socket 108 fluidically connected to discharge the fluid from the interior of the annular receptacle 124 through the outlet hole 108A to the outlet socket 108.

A seal 36 provided radially outwardly at the first end disk 14 of the filter element 10 and a seal 38 provided radially inwardly at the second end disk 16 are provided for sealing between the raw fluid side 50 and the clean fluid side 52. In this way, when pushing the filter element 10 onto the central element 20, the filter element 10 is centered relative to the housing axis M by the centering element 40 contacting the annular receptacle 124. Furthermore, the seal 38 of the filter element 10 seals against the annular receptacle 124 to separate the raw fluid side 50 from the clean fluid side 52. The other seal 36 is contacting the inner side of the housing bottom part 112 and seals thus also reliably.

The filter element 10 is configured to be lockable with the filter housing 110 by means of locking elements 46 wherein the locking elements 46 are arranged at the second end disk 16 and can serve for locking the filter element 10 at the receptacle 124 and/or at the central element 20.

The central element 20 comprises conductors 21 as water level detection pins which can serve as an electrically contacting water level sensor which is arranged at the central element 20 or is connected to the central element 20, in particular a water level sensors such as a WIF sensor. The conductors 21 are connected by means of central element-associated electrical connecting elements 32 with housing-associated electrical connecting elements 120. Sensors 21 and/or heaters 20A can be integrated into the central element 20, The heater 20A is illustrated schematically by a dashed line in FIG. 1.

In FIG. 2, a longitudinal section of the filter housing 110 with central element 20 and strainer filter 34 of the filter system 100 of FIG. 1 is illustrated. The central element 20 is pushed onto the receptacle 124 and fixedly connected to the receptacle 124, for example, glued or fused. In this way, the central element 20 is reliably fastened to the filter housing 110. The central element 20 is surrounded at its radial outer side by the strainer filter 34. The conductors 21 are connected by electrical connecting elements 32 which are arranged in the central element 20 with electrical connecting elements 120 provided at the housing top part 114.

The bottom part of the central element 20 comprises a socket 37 which serves at its radial outer side 25 for receiving an opening in the first end disk 14 of the filter element 10 and comprises a sealing contour 25 so that the central element 20 is sealed at the socket 37 relative to the end disk 14.

Figure 3:
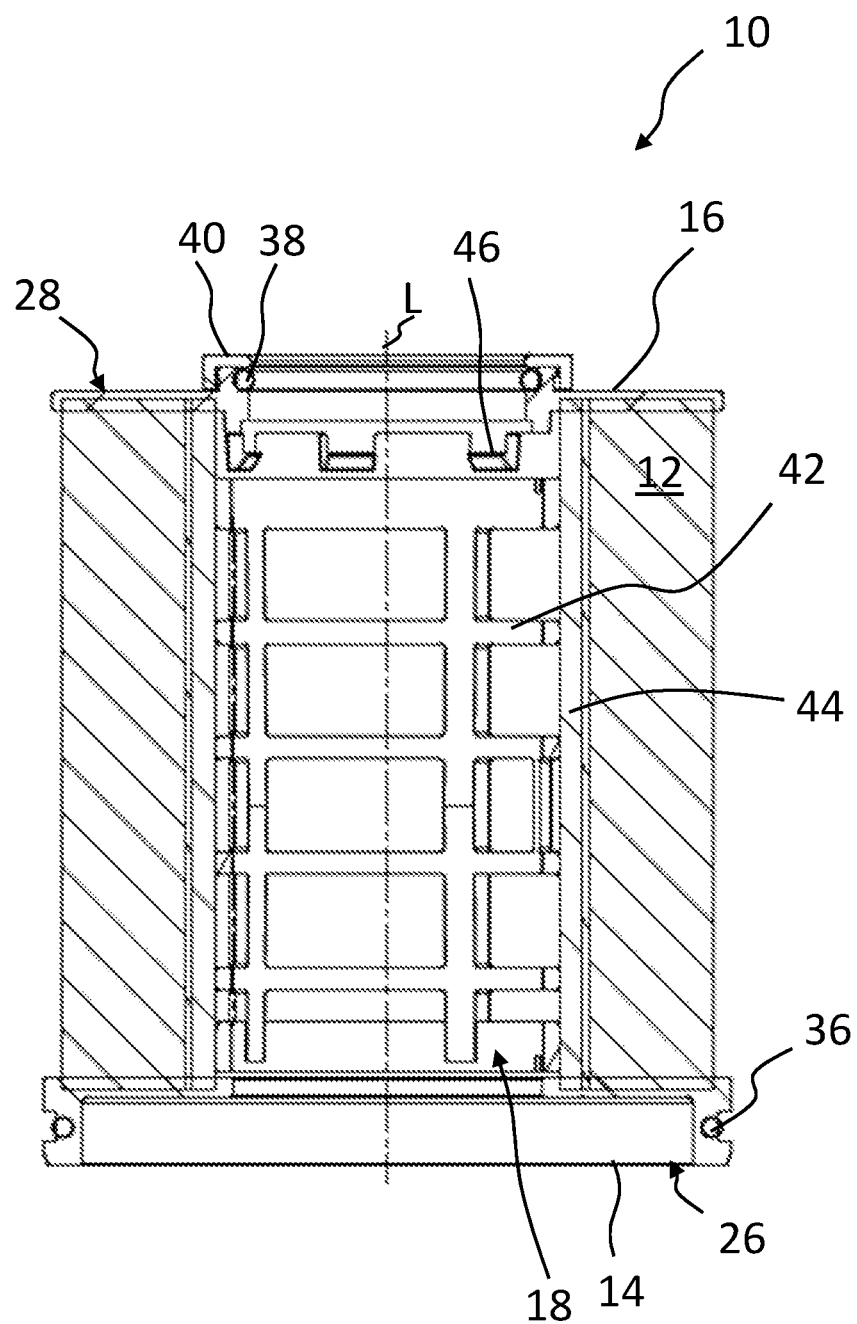
FIG. 3 is a longitudinal section of the filter element of the filter system of FIG. 1.

FIG. 3 shows a longitudinal section of the filter element 10 of the filter system 100 of FIG. 1. The filter element 10 with a longitudinal axis L comprises the filter bellows 12 which is arranged about the longitudinal axis L, with the first end disk 14 at the first end face 26 and the second end disk 16 at the second end face 28.

The filter element 10 comprises in its interior 18 within the filter bellows 12 the central tube 42 which serves for reinforcing the filter bellows 12 relative to fluid pressure of the filtered fluid. The coalescing medium 44 is arranged between filter bellows 12 and central tube 42.

The seal 36 is provided radially outwardly positioned at the first end disk 14 of the filter element 10 and the seal 38 radially inwardly positioned at the second end disk 16 for sealing between the raw fluid side 50 and the clean fluid side 52.

The second end disk 16 comprises furthermore the centering element 40 which surrounds the seal 38 partially and serves for centering the filter element 10 when pushed onto the receptacle 124 of the filter housing 110, as illustrated in FIG. 1.

While specific embodiments of the invention have been shown and described in detail to illustrate the inventive principles, it will be understood that the invention may be embodied otherwise without departing from such principles.

What is claimed is:

1. A filter housing for a filter system, the filter housing having a housing axis, the filter housing comprising: a housing top part having: an annular receptacle formed as an annular projection on an inner surface of the housing top part and projecting in a direction of the housing axis into an interior of the filter housing, the annular receptacle comprising at least one electrical connecting element arranged in an interior of the annular receptacle; an outlet socket arranged on the housing top part and fluidically connected to the interior of the annular receptacle through the top housing part, the outlet socket fluidically connected to discharge the fluid from the interior of the annular receptacle; an inlet socket arranged on the housing top part and configured to supply fluid to be filtered into the interior of the filter housing; and
an axially elongated central element fixedly mounted onto the top housing part and extending along the housing axis in the interior of the filter housing, the axially elongated central element of the housing top part having an annular strainer filter fixed onto the axially elongated central element, the annular strainer filter spaced apart radially outwardly away from and surrounding a radial outer side of the axially elongated central element of the housing top part, the spacing forming an annular fluid outflow channel arranged between and bounded by the radial outer side of the axially elongated central element and a radially inner side of the annular strainer filter;
a housing bottom part arranged along the housing axis of the filter housing and connected to the housing top part, wherein an axial direction, as used herein, is a direction of the housing axis;
wherein the annular strainer filter is sealably connected onto the annular receptacle, fluidically connecting the annular fluid outflow channel of the axially elongated central element to the interior of the annular receptacle and to the outlet socket to discharge the fluid from the annular fluid outflow channel;
wherein a filter element is detachably connected to the axially elongated central element;
wherein a heater is integrated into the axially elongated central element of the housing top part, the heater received into the interior of the filter element.

2. A filter system for filtering a fluid, the filter system comprising: a filter housing having a housing axis, the filter housing comprising: a housing top part having:
an annular receptacle formed as an annular projection on an inner surface of the housing top part and projecting in a direction of the housing axis into an interior of the filter housing; an outlet socket arranged on the housing top part and fluidically connected to an interior of the annular receptacle through the top housing part, the outlet socket fluidically connected to discharge the fluid from the interior of the annular receptacle; an inlet socket arranged on the housing top part and configured to supply a fluid to be filtered into the interior of the filter housing; and
an axially elongated central element fixedly mounted onto the top housing part and extending along the housing axis in the interior of the filter housing, the axially elongated central element of the housing top part having an annular strainer filter fixed onto the axially elongated central element, the annular strainer filter spaced apart radially outwardly away from and surrounding a radial outer side of the axially elongated central element of the housing top part, the spacing forming an annular fluid outflow channel arranged between and bounded by the radial outer side of the axially elongated central element and a radially inner side of the annular strainer filter;
a housing bottom part arranged along the housing axis of the filter housing and connected to the housing top part, wherein an axial direction, as used herein, is a direction parallel to the housing axis;
wherein the annular strainer filter is connected onto the annular receptacle, fluidically connecting the annular-fluid outflow channel of the axially elongated central element to the interior of the annular receptacle and the outlet socket to discharge the fluid from the annular fluid outflow channel; wherein the axially elongated central element is part of the filter housing, fixedly attached to the top housing part and extends along the housing axis in the interior of the filter housing; a filter element arranged in the interior of the filter housing, the filter element comprising:

a filter bellows arranged about and surrounding a radially outer side of the annular strainer filter and of the axially elongated central element, wherein the elongated central element of the housing top part projects into an interior of the filter element when the filter element is installed inside the housing; wherein the filter element, when installed inside the filter housing, seals to the annular receptacle and fluidically separates a raw fluid side from a clean fluid side; wherein fluid at the clean side of the filter element flows through the annular strainer filter into the annular fluid outflow channel of the axially elongated central element of the housing top part, and continuing axially upwardly through the interior of the annular receptacle to the outlet socket;

wherein a heater is integrated into the axially elongated central element of the housing top part, the heater received into the interior of the filter element.

3. The filter system according to claim 2, wherein the annular receptacle is configured to radially center the filter element in the filter housing by interacting with a centering element of the filter element.

4. The filter system according to claim 2, further comprising a sensor arranged on an axial lower portion of the axially elongated central element of the housing top part, wherein the axially elongated central element comprises at least one conductor configured to electrically contact the sensor.

5. The filter system according to claim 4, wherein the sensor is a water level sensor.

6. The filter system according to claim 5, wherein the filter housing comprises at least one electrical connecting element and wherein the axially elongated central element comprises at least one electrical connecting element, wherein the at least one conductor is connected by the at least one electrical connecting element of the axially elongated central element to the at least one electrical connecting element of the filter housing.

7. The filter system according to claim 4, wherein the sensor is integrated into the axially elongated central element, the sensor received into the interior of the filter element when the filter element is installed in the filter housing.

8. The filter system according to claim 2, wherein the filter element includes an end disk have a central opening through which the elongated central element of the housing top part projects into the interior of the filter element; wherein the end disk has a plurality of locking elements formed on an axially inner side of the end disk, the plurality of locking elements projecting axially inwardly from the end disk into the interior of the filter element; wherein the plurality of locking elements engage against a radially outer surface of the axially elongated central element of the housing top part, locking the filter element onto the housing top part through the axially elongated central element.

\* \* \* \* \*